United States Patent [19]
Kotaki

[11] Patent Number: 5,423,893
[45] Date of Patent: Jun. 13, 1995

[54] PLASTIC FILTER, ITS INJECTION MOLDING DIE AND PRODUCING METHOD

[76] Inventor: Daizo Kotaki, 14-22 Omataminami-cho, Ashikaga-city, Tochigi Pref. 329-41, Japan

[21] Appl. No.: 78,974

[22] Filed: Jun. 17, 1993

[30] Foreign Application Priority Data

| Jun. 18, 1992 | [JP] | Japan | 4-184464 |
| Jul. 21, 1992 | [JP] | Japan | 4-215614 |
| Oct. 21, 1992 | [JP] | Japan | 4-308205 |
| Oct. 21, 1992 | [JP] | Japan | 4-324596 |
| Nov. 18, 1992 | [JP] | Japan | 4-351885 |

[51] Int. Cl.$^6$ .................... B01D 29/03; B01D 39/08
[52] U.S. Cl. .................... 55/511; 55/522; 55/528; 210/499
[58] Field of Search ............... 55/494, 497, 509, 511, 55/515, 516, 518, 519, 522, 525, 527, 528; 210/498, 499

[56] References Cited

U.S. PATENT DOCUMENTS

| 58,393 | 10/1866 | Duffee | 55/528 X |
| 121,764 | 12/1871 | Duffee | 55/522 X |
| 2,641,826 | 6/1953 | Dreznes | 55/525 X |
| 3,109,724 | 11/1963 | Heckman et al. | 55/525 X |
| 3,237,387 | 3/1966 | Haugen et al. | 55/522 X |
| 3,276,942 | 10/1966 | Ewing | 55/522 X |
| 3,873,656 | 3/1975 | Garner | 264/55 |
| 4,268,286 | 5/1981 | Steer et al. | 55/527 X |
| 4,544,525 | 10/1985 | Honda et al. | 55/515 X |
| 4,872,888 | 10/1989 | Ehrfeld et al. | 55/522 X |
| 4,902,420 | 2/1990 | Pall et al. | 210/498 X |
| 5,076,924 | 12/1991 | Persson et al. | 55/494 X |

FOREIGN PATENT DOCUMENTS

| 61-19420 | 3/1979 | Japan . |
| 60-49571 | 2/1983 | Japan . |
| 58-50131 | 3/1983 | Japan . |
| 62-13885 | 1/1984 | Japan . |
| 63-15890 | 3/1984 | Japan . |
| 60-26750 | 2/1985 | Japan . |
| 63-10805 | 3/1985 | Japan . |
| 61-10422 | 1/1986 | Japan . |
| 61-16111 | 5/1986 | Japan . |
| 61-55852 | 11/1986 | Japan . |
| 3-25950 | 3/1987 | Japan . |
| 63-178020 | 7/1988 | Japan . |
| 63-268606 | 11/1988 | Japan . |
| 63-268607 | 11/1988 | Japan . |
| 64-72837 | 3/1989 | Japan . |
| 1-112649 | 3/1989 | Japan . |
| 1-203010 | 8/1989 | Japan . |
| 2-9142 | 1/1990 | Japan . |
| 2-303811 | 12/1990 | Japan . |
| 3-79320 | 4/1991 | Japan . |
| 3-44886 | 7/1991 | Japan . |
| 3-153329 | 7/1991 | Japan . |
| 3-219942 | 9/1991 | Japan . |
| 3-236947 | 10/1991 | Japan . |
| 4-82977 | 3/1992 | Japan . |
| 4-20582 | 5/1992 | Japan . |
| 4-208413 | 7/1992 | Japan . |
| 4-216925 | 8/1992 | Japan . |
| 4-246509 | 9/1992 | Japan . |
| 4-52019 | 12/1992 | Japan . |
| 4-52032 | 12/1992 | Japan . |
| 5-169569 | 7/1993 | Japan . |
| 5-293858 | 11/1993 | Japan . |
| 5-293859 | 11/1993 | Japan . |

*Primary Examiner*—Robert Spitzer
*Attorney, Agent, or Firm*—Rogers & Wells

[57] ABSTRACT

A meshed plastic filter of a narrow-pitch net with a net structure and a frame structure formed in either a square or a circular overall shape into a plastic injection molded unitary body includes a dam/discharge rib in the net structure for storing molten plastic material and accumulating pressure of the molten plastic material, thereby enabling implementations of a fine-pitch net filter having mesh holes of 0.2 mm in diameter at a spacing of 0.3 mm, which has diverse applications, such as a filter or sieve for gasoline or oil, a dust collector filter and other various filtration.

12 Claims, 14 Drawing Sheets

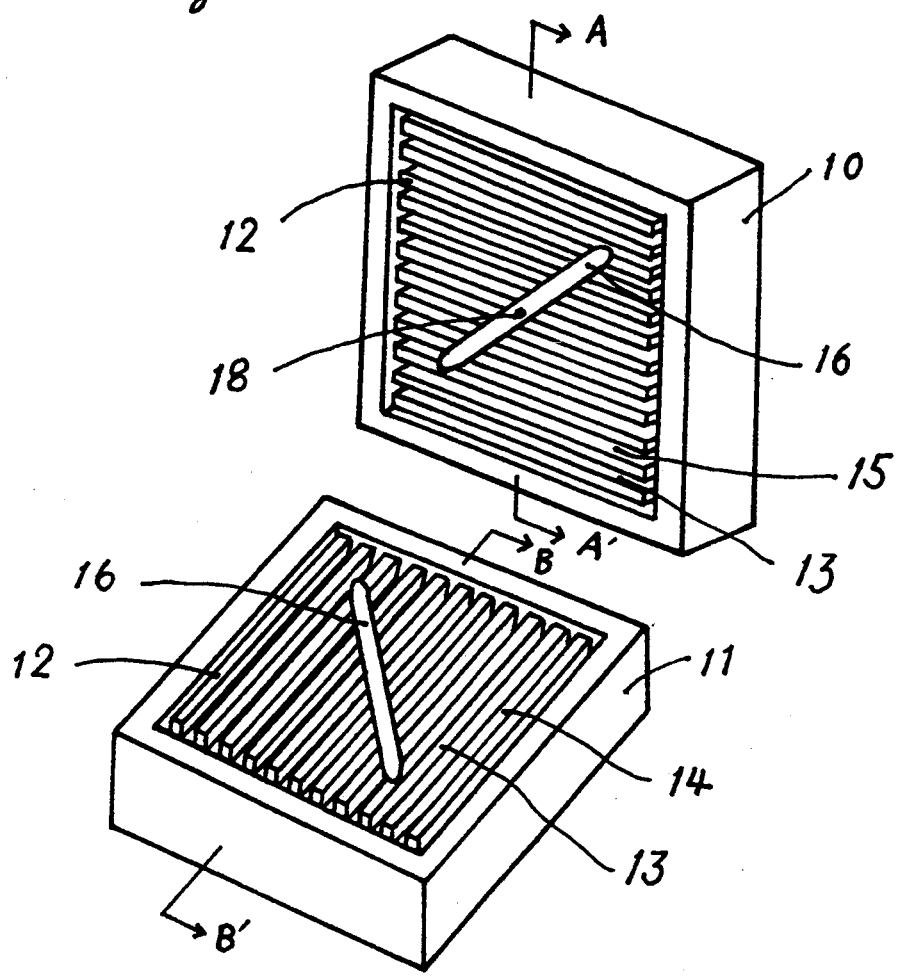
Fig. 5
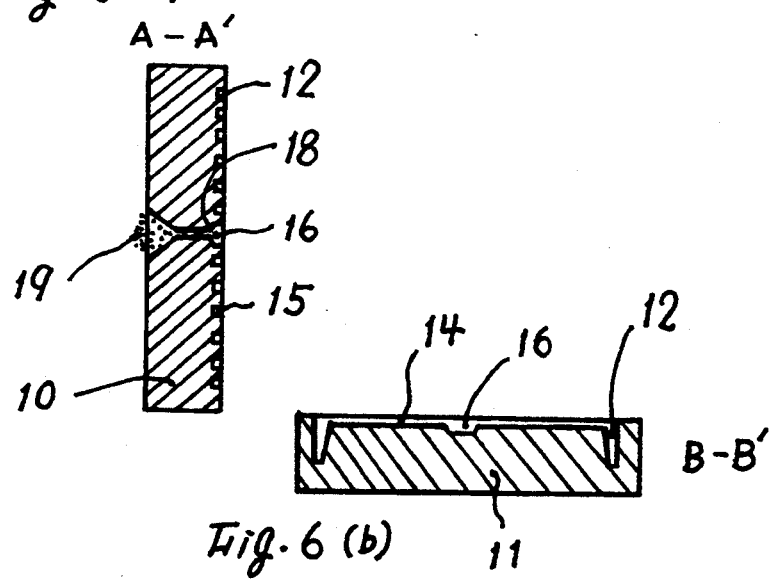
Fig. 6(a)
Fig. 6(b)

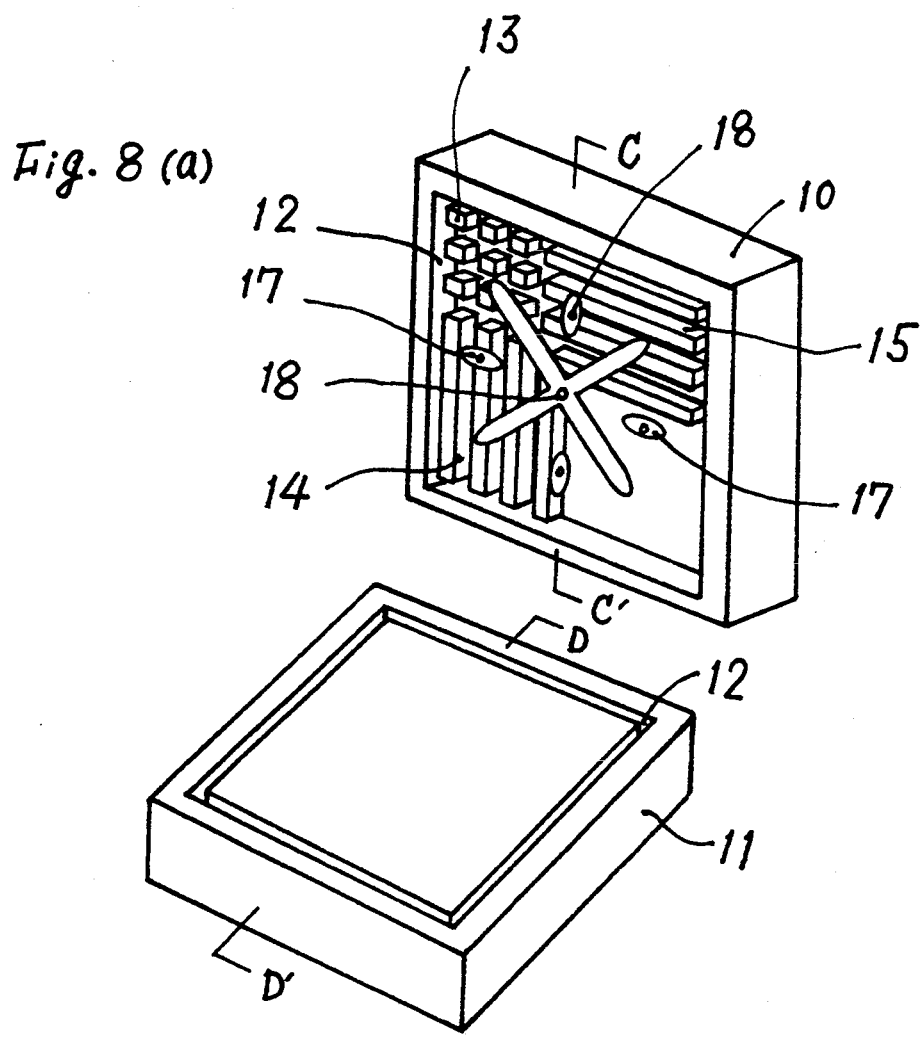
Fig. 8 (a)
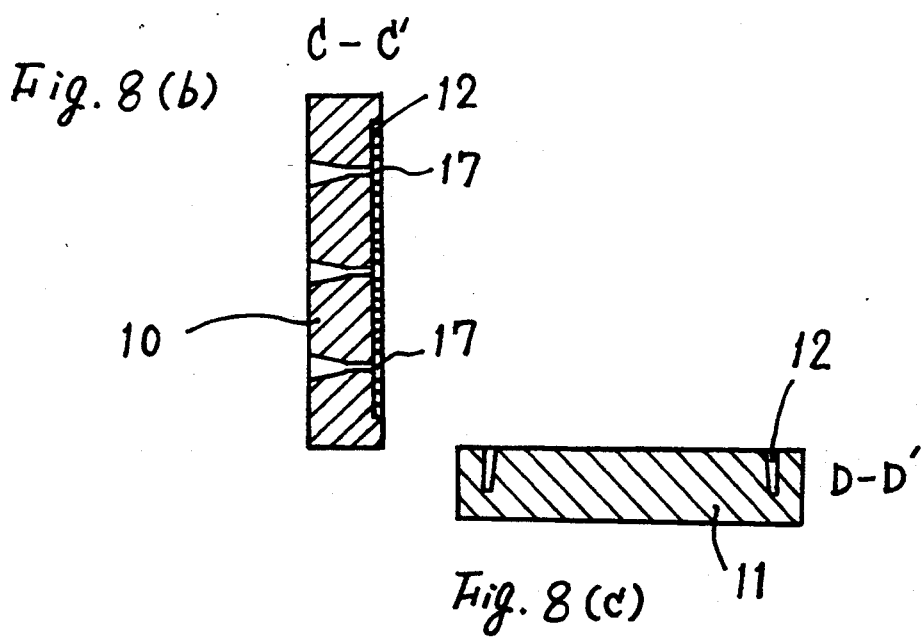
Fig. 8 (b)
Fig. 8 (c)

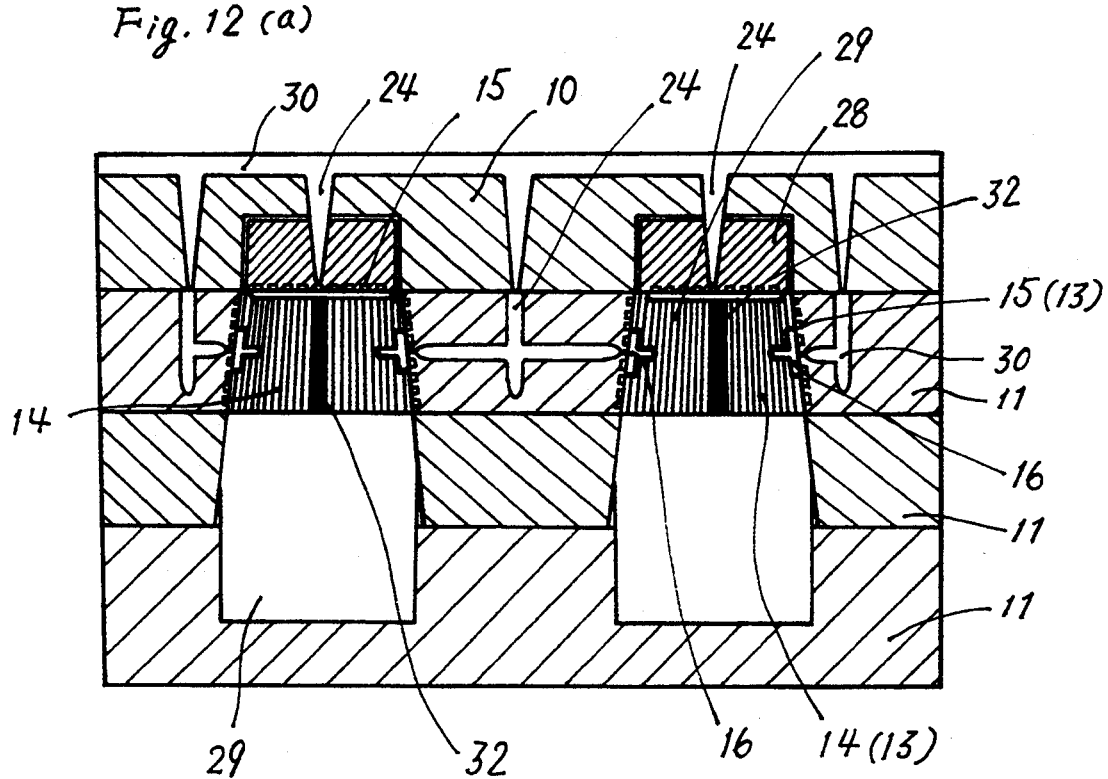
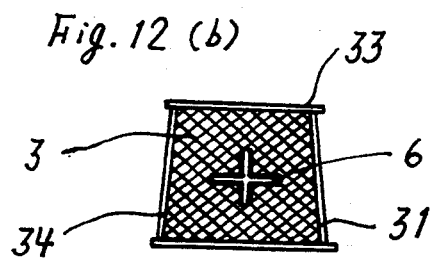

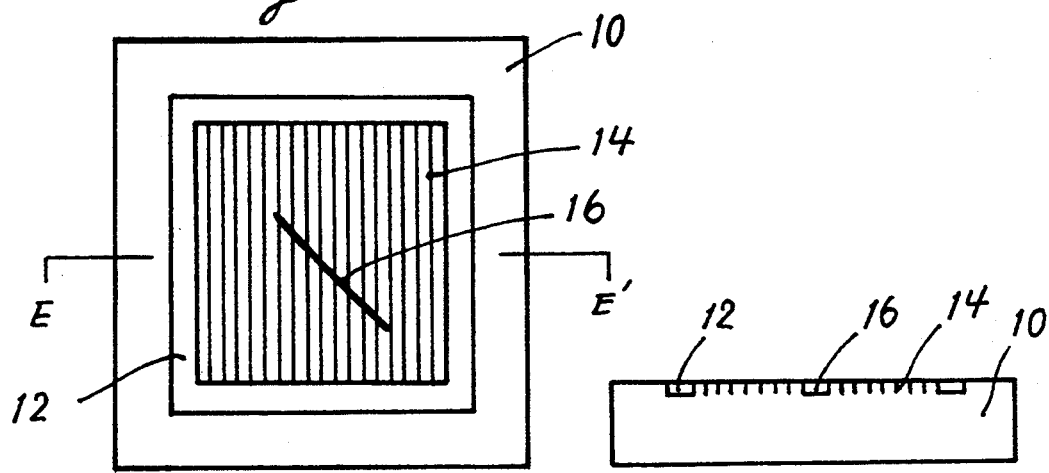
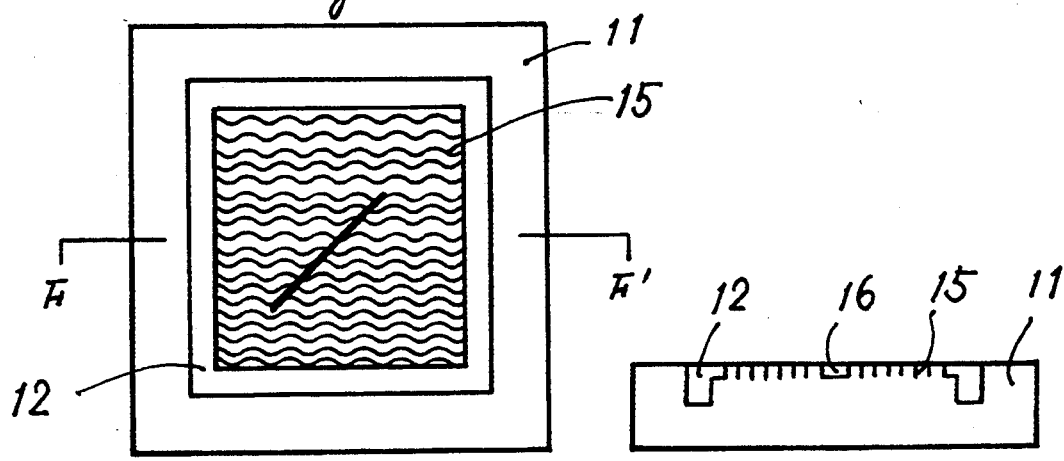
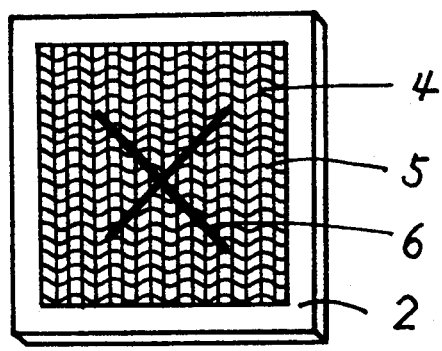

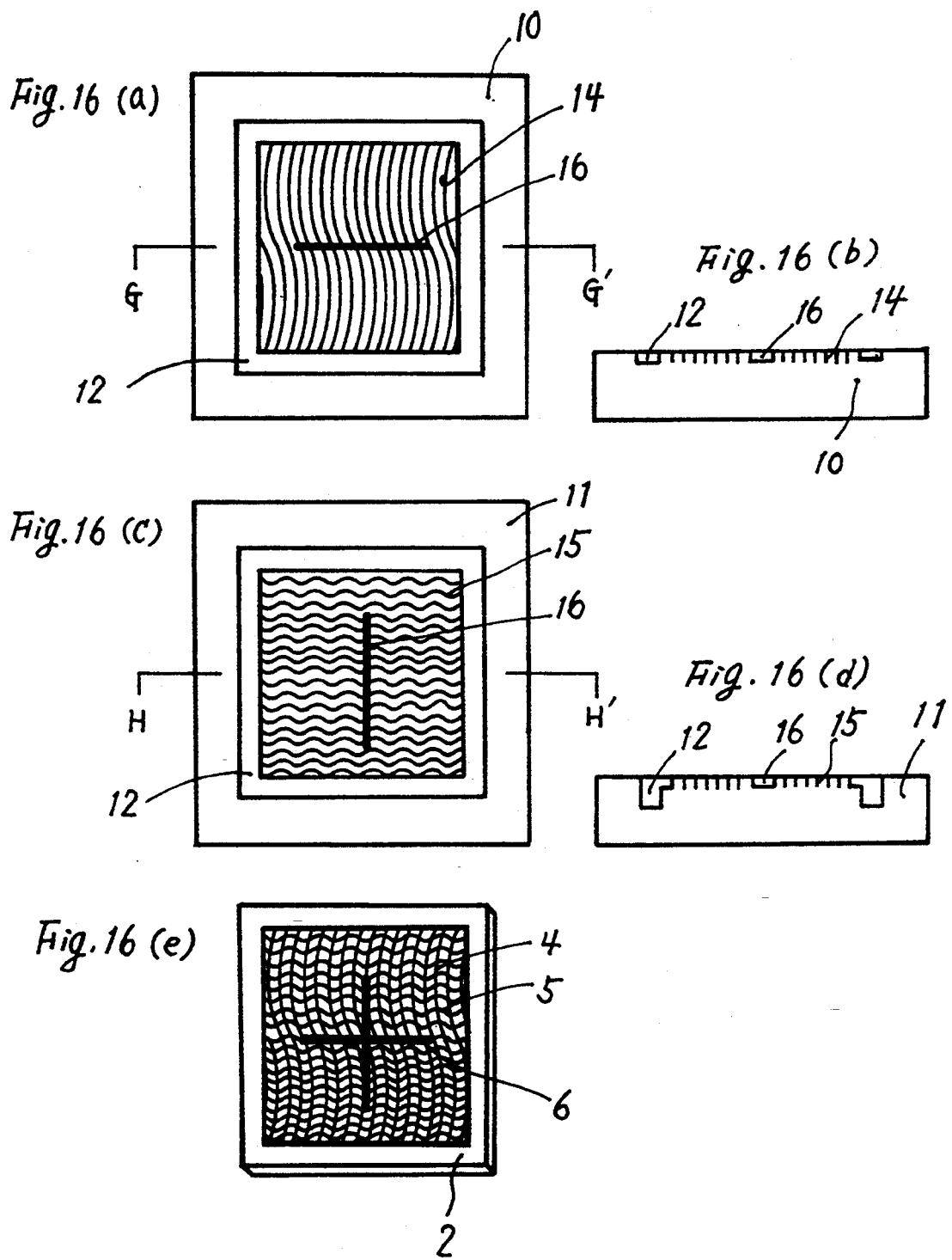

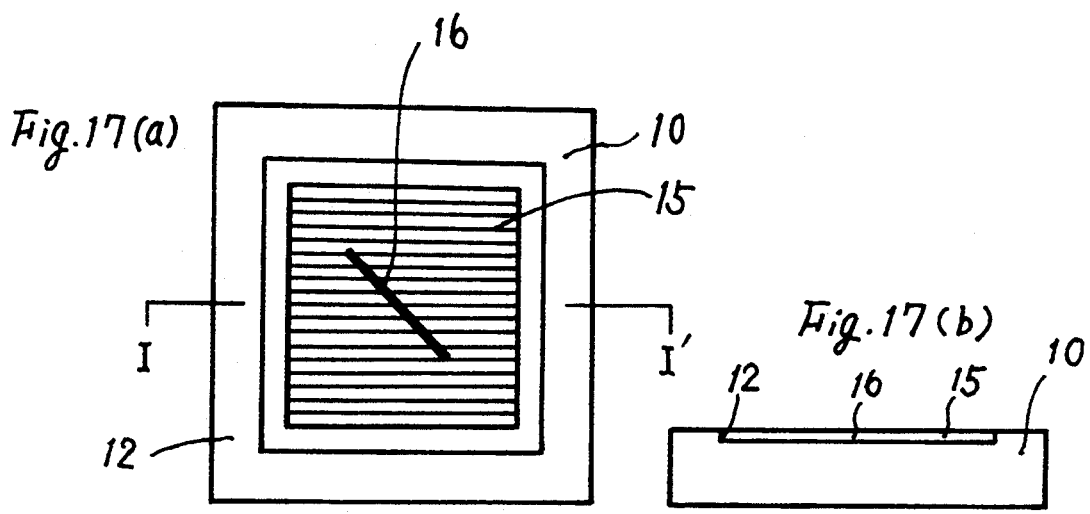
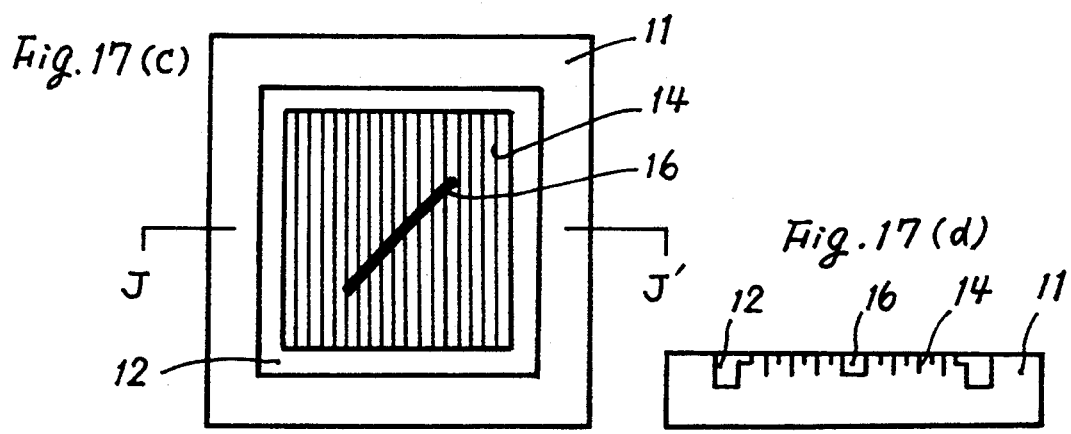
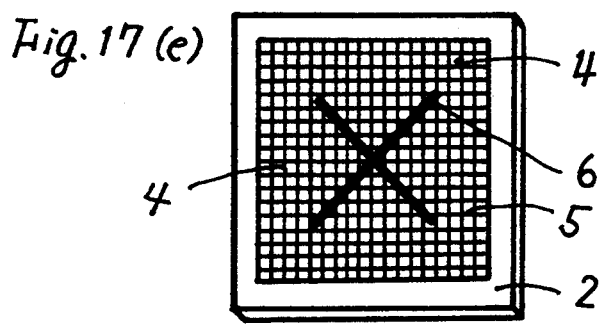

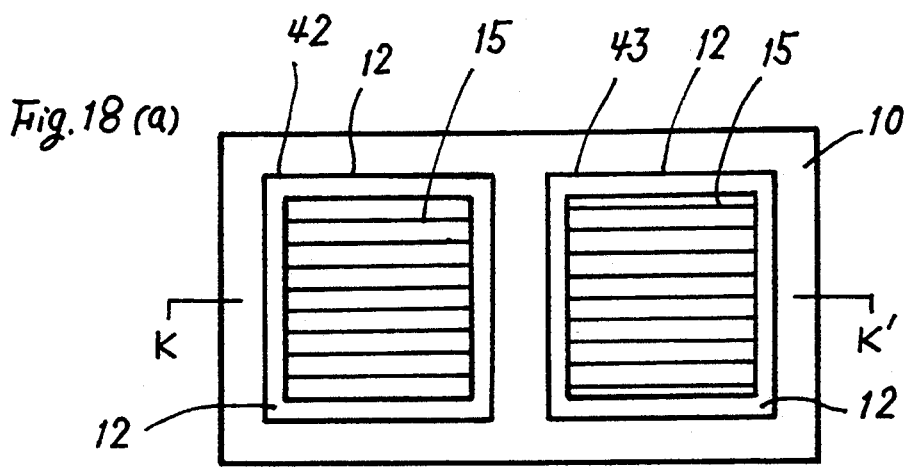
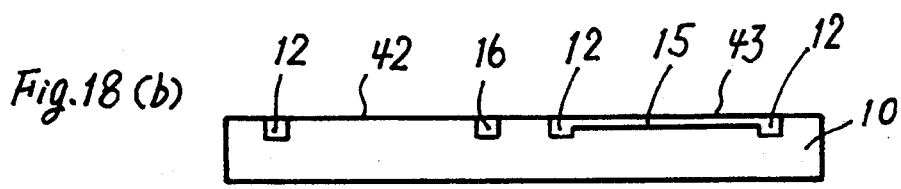
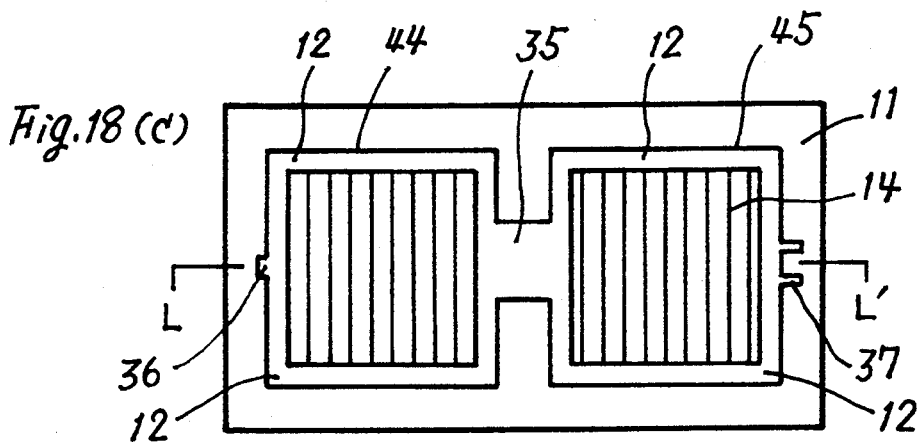
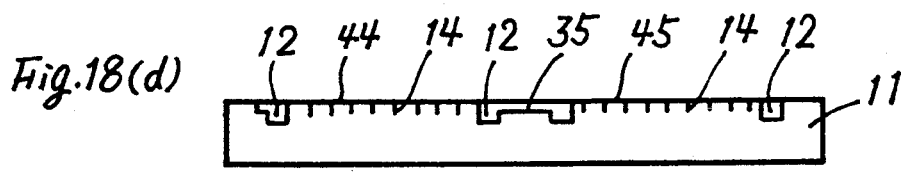
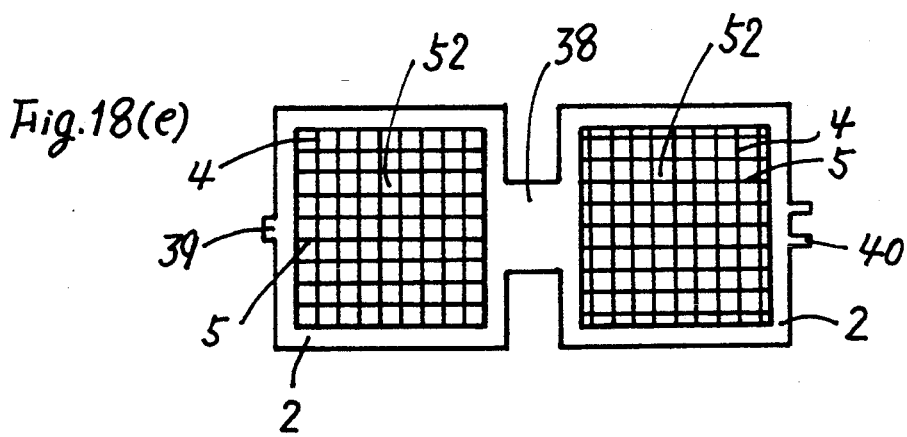

2

PLASTIC FILTER, ITS INJECTION MOLDING DIE AND PRODUCING METHOD

BACKGROUND OF THE INVENTION

1. Field Of The Invention

The present invention relates to improvements in or relates to the production of a precision plastic filter with a meshed net and a frame.

The meshed filter has diverse applications, including a filter or sieve for gasoline or oil used in a car or fan heater, a dust collector filter for air conditioner, a grille cover for speaker or earphone, a strainer for tea or coffee, a supporter for the human body, a grip cover for golf club or bat and other various filtration.

2. Description Of The Related Prior Art

The manufacture of narrow pitch nets by conventional injection molding methods was impractical because it was difficult to distribute plastic resin material uniformly over the entire die during the injection molding process.

In the past, a net and a surrounding plastic frame were molded and produced, separately, and then the net was cut and fitted on the frame, followed by insert molding by a skilled worker.

The net and frame of the plastic filter would not be molded into a single and integral unit through one process of molding unless the net structure permits smooth and even injection and distribution of plastic molding material throughout the entire die.

For a conventional molding method, it was impossible to produce a plastic filter having a net and frame in an integral unit through a single process, because there was no means to establish a high pressure enough to inject and distribute plastic material into the die and because the conventional injection molding method then injected the material with high pressure into the narrow net grooves and frame groove, separately. Although not shown or suggested in drawings, the drawbacks of the above prior art are as follows:

(1) Where low-cost equipments or apparatuses are used to inject the plastic material into net rib grooves by low pressure, it is likely that there would be some of the net ribs missing especially at distant locations in the die from a center injection opening or the material may not reach frame grooves. With a smaller pitch of the ribs, it is more difficult to make a filter with an integral formation or structure of the net and frame.

(2) If high pressure injection is used, there would be no ribs missing but it needs expensive equipments. Provided however the pressure applied to the plastic material is excessive, the plastic material flowing over in the die would close the meshes of the net.

The object of the present invention is to solve the above discussed drawbacks of the prior art injection molding method.

SUMMARY OF THE INVENTION

A molded net of this invention, compared with a conventional woven net, has wrap and woof intersections which are bonded together and therefor have great physical strength. A frame section supporting and surrounding the net is molded in a unitary body with the net at the same time, so cumbersome tasks are eliminated and the physical strength is increased at the same time.

In tests conducted by the inventor, a 100-t molding machine was used and nets were produced successfully with holes measuring 0.2 mm in diameter at a spacing of 0.3 mm evenly on all four sides of the net.

In making molded filters having a net and a frame as an integral and unitary unit according to the injection molding method, apparatus and die of the present invention, plastic material is injected through a gate. Initially, the plastic material enters at least one dam/discharge rib which has a greater diameter than that of ribs of the net. The dam/discharge rib stores the plastic material like a dam for a while, because the dam/discharge rib is not connected directly to the frame with both ends thereof serving as a dead end for the plastic material. The dam/discharge rib accumulates pressure high enough to inject and distribute the plastic material throughout the entire die. Under the circumstances, the plastic material is discharged from the dam/discharge rib under a certain pressure into a number of net rib grooves in the die which are connected to the dam/discharge rib, and particularly into all of the net rib grooves including those in remote locations at four corners of the die. The function of the dam/discharge rib makes it possible to manufacture net/frame integral plastic filters of a minute net structure by the low-pressure plastic molding method. Vertical ribs and horizontal ribs of the net are connected together at their intersections to form a single unit and enhance the physical strength of the net structure.

The dam/discharge ribs have basically a radiation shape from center of the net toward the frame, but may have any variation, such as a symmetrical "T" shape, a "H" shape, or a "C" shape. Or the dam/discharge ribs may comprise an additional branch rib open to the main dam/discharge rib, dam/discharge ribs having a greater diameter at the remote positions of the die or auxiliary dam/discharge ribs which are independent of the main dam/discharge ribs.

In order to improve filtering performance, the net configuration or the net grooves in the die may be formed in a serpentine shape in either horizontal or vertical direction or both of them in such a manner to shut off or filter out fine dusts or particles.

Additional features of the present invention are described in relation to the description of the preferred embodiments of the present invention.

The invention will be understood by the Detailed Description of the Preferred Embodiment in conjunction with the appended drawings, of which:

BRIEF DESCRIPTION OF THE DRAWINGS

FIG. 5 is a perspective view of a die for producing a plastic filter of the present invention;

FIGS. 6(a) and 6(b) are cross sections taken along the lines A—A' and B—B' in FIG. 5;

FIG. 8(a) is a perspective view of a die for producing a plastic filter according to another modified embodiment of the present invention;

FIGS. 8(b) and 8(c) are cross sections taken along the lines C—C' and D—D' in FIG. 8(a);

FIG. 12(a) is a cross section of a die for producing a cylindrical shaped plastic filter according to a further modified embodiment of the present invention;

FIG. 12(b) is an elevation of the plastic filter produced by the die shown as FIG. 12(a);

FIGS. 15(a) to 15(e) are elevations and cross sections of the die and the plastic filter according to a modified embodiment of the present invention in which horizontal rib grooves are formed in a serpentine shape in a horizontal direction with respect to a surface of the filter;

FIGS. 16(a) to 16(e) are elevations and cross sections of the die and the plastic filter according to a modified embodiment of the present invention in which both horizontal and vertical rib grooves are formed in a serpentine shape;

FIGS. 17(a) to 17(e) are elevations and cross sections of the die and the plastic filter according to a modified embodiment in which vertical rib grooves are formed in a serpentine shape in a vertical direction with respect to a surface of the filter;

FIGS. 18(a) to 18(e) are elevations and cross sections of a die for producing a double piled filter and the filter so produced according to a further modified embodiment of the present invention.

DETAILED DESCRIPTION OF PREFERRED EMBODIMENTS OF THE INVENTION

Figure 1:
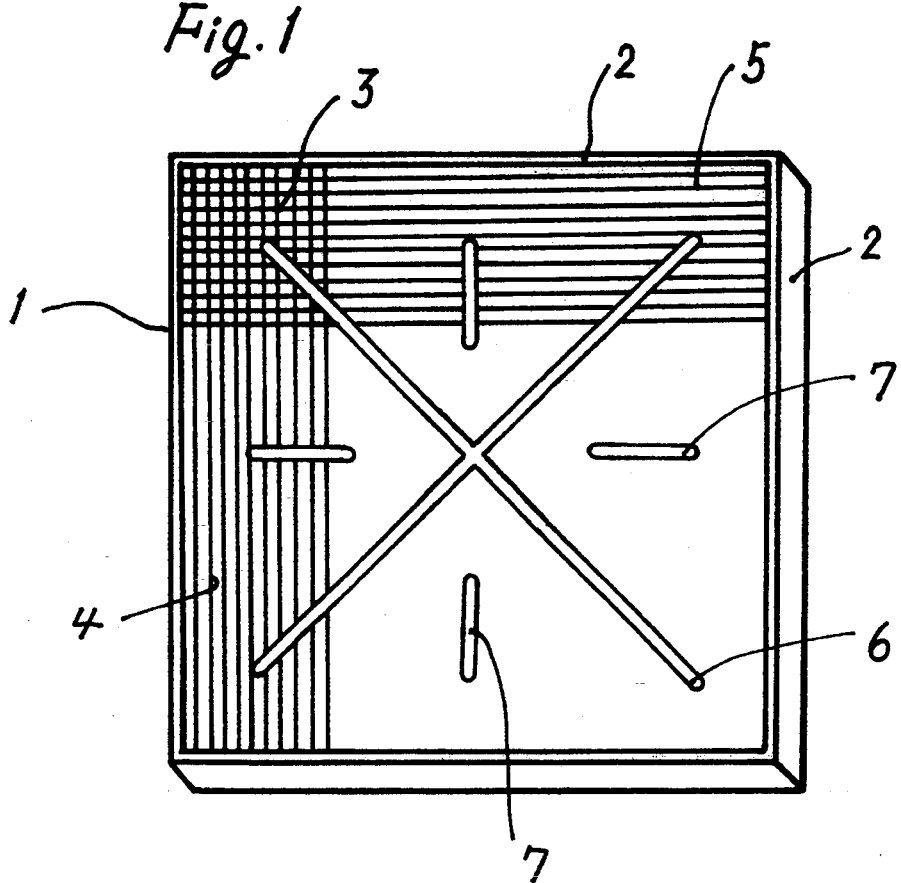
FIG. 1 is an elevation of a plastic filter according to a preferred embodiment of the present invention.

Referring now to the drawings, the present invention will be described in terms of its embodiments in detail as follows.

Figure 2:
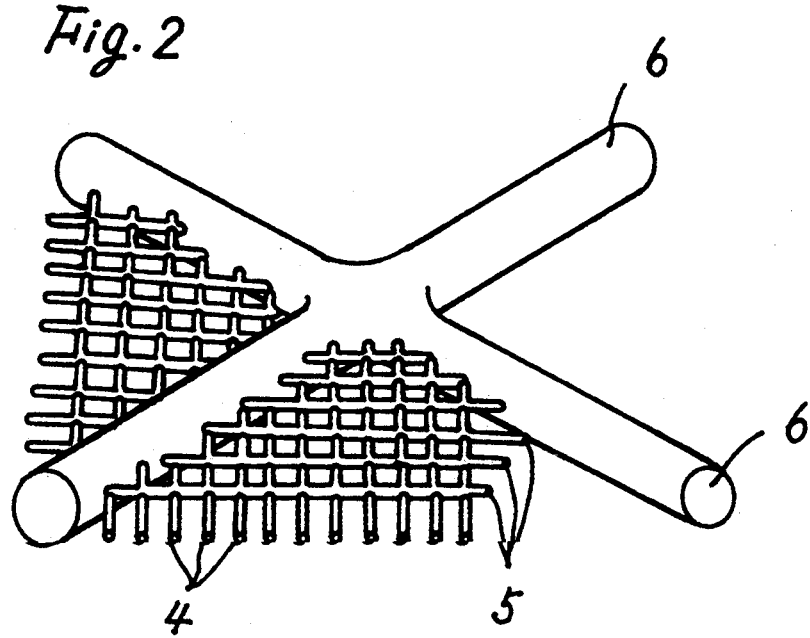
FIG. 2 is a partially enlarged view of a meshed net of FIG. 1.

FIGS. 1 and 2 are views of a meshed plastic filter of the present invention. A plastic filter 1, for use as a filter for gasoline or oil, a sieve for particle, a net for cultivating the young of fishes, for example, has a rectangular frame 2 defining the periphery of the filter 1 and a meshed net structure 3 consisting of vertical and horizontal ribs or filaments 5 inside the frame 2. Dam/discharge ribs 6 which have the following conditions are placed on the net structure 3:

(1) The vertical and horizontal ribs or filaments are connected together;

(2) The diameter of the dam/discharge ribs 6 is substantially greater than that of the vertical and horizontal ribs to keep or store melted plastic material like a dam, once injected through a gate with pressure, and then accumulate pressure high enough to discharge and distribute the plastic material throughout the whole net structure.

(3) The ends of the dam/discharge ribs 6 are closed ones and not connected directly to the frame 2 so that both ends of the dam/discharge ribs 6 provide a dead end for a flow of the plastic material to permit accumulation of the plastic material with a resultant increase in pressure for discharge.

The dam/discharge ribs 6 provide an effective and satisfactory solution to the problem of the prior art that the plastic material could not penetrate equally the whole net structure and the resulting net structure was incomplete because of some missing ribs especially at the corners of the filter.

Figure 3:
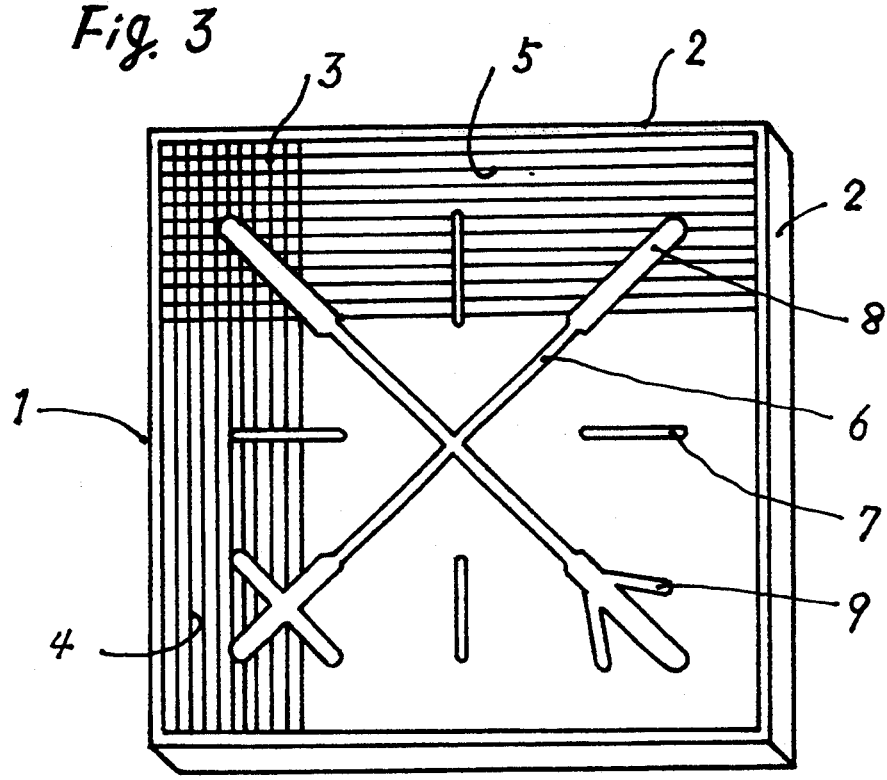
FIG. 3 is an elevation of modified shapes of dam/discharge ribs which have many variations.

FIG. 3 shows modified forms of the dam/discharge ribs according to the present invention. A dam/discharge rib 8 has a diameter greater than that of the dam/discharge rib 6. Another modified rib 7 is an auxiliary dam/discharge rib and it has more broad rib than said dam/discharge ribs 6. Another form is a branch dam/discharge rib 9. The dam/discharge ribs 7-9 are formed in the net structure for making smooth and equal the injecting and penetration of the plastic material into the net and frame structure.

Figure 4:
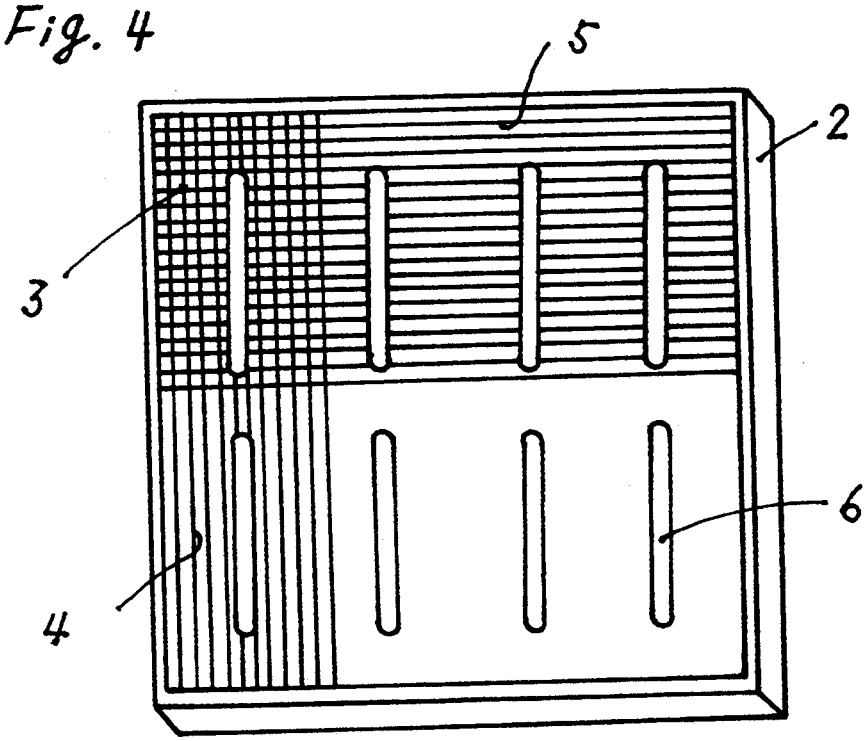
FIG. 4 is an elevation of a modified embodiment of the present invention in which dam/discharge ribs are placed in parallel on the net.

FIG. 4 shows another embodiment of the invention, in which the dam/discharge ribs 6 are formed independently and in parallel.

The above dam/discharge ribs 6-9 are very effective for molding the plastic filter of a fine-pitch net structure in one process and their effect and advantages will be made clear by the following description regarding structures of dies and methods of plastic injection molding.

FIG. 5 shows a basic die shape of the invention, and the die may be a nest of dies made for customers.

The die comprises an upper die 10 and a lower die 11, each having net grooves 13, which include vertical rib grooves 14 and horizontal rib grooves 15 dam/discharge rib grooves 16, and frame grooves 12 formed therein.

FIGS. 6(a) and 6(b) are cross sections taken along the lines A—A' and B—B', wherein the upper die 10 has a gate 18 for pouring plastic material 19 to the dam/discharge rib grooves 16.

The dam/discharge rib grooves 16 on the upper die 10 guide the plastic material 19 from the gate 18 to the horizontal rib grooves 15 for injecting entirely the plastic material 19 into all the horizontal rib grooves 15.

Because the dam/discharge rib grooves 16 are wider in diameter than the horizontal rib grooves 15, the plastic material 19 is first guided and stored in a space as defined by the dam/discharge rib grooves 16. This storage results in increase in pressure of the plastic material for uniform injection and distribution of the plastic material. After that, the plastic material 19 is injected into the narrow horizontal rib grooves 15 with a certain constant pressure, so that the material flows and penetrates the narrow horizontal rib grooves 15 equally. In the dam/discharge rib grooves 16 on the lower die 11, like those in the upper die 10, the plastic material 19 flows and distributes the vertical rib grooves 14 under pressure through the dam/discharge rib grooves 16 equally.

The dam/discharge rib grooves 16 are arranged radially from the center of the net structure toward the frame groove 12 and are not connected to the frame directly, so that the dam/discharge rib grooves 16 can store high pressure necessary for uniform injection and distribution of the plastic material. However, if the dam/discharge rib grooves 16 are not provided on the net 3 as in the prior art die, the plastic material 19 would have flown easily into the frame groove 12 to bypass the vertical and horizontal rib grooves 14, 15 so that the plastic material 19 would have failed to fill all of the vertical and horizontal rib grooves 14, 15.

Further, there is no way that the plastic material 19 flows backward in the die, so that no bubbles or gas is observed in the rib grooves of the die and there is no need to confine such bubbles or gas. The reasons therefor are because the plastic material is given a certain pressure at all times to flow itself toward the frame groove 12 through the function of the dam/discharge rib grooves of the upper die 10, and that the dam/discharge rib grooves 16 are extended radially, and the ends of the dam/discharge rib grooves 16 are closed ends and not connected to the frame groove 12.

It is preferable that the cross section of the grooves be semi-circular in view of the flowability of the plastic material, but a semi-ellipse or trapezoid cross section is also suitable for the invention.

The width and depth of the dam/discharge rib grooves 16 storing the plastic material 19 and generating pressure or power for distribution, are determined with respect to the width and depth of the vertical and horizontal rib grooves 4, 5. For example, when the net grooves are 0.3 mm deep and 0.2 mm wide at the bottom thereof with top openings of 0.5 mm wide, the diameter of the dam/discharge rib grooves 16 is selected to be about 2 mm ⌀.

Figure 7:
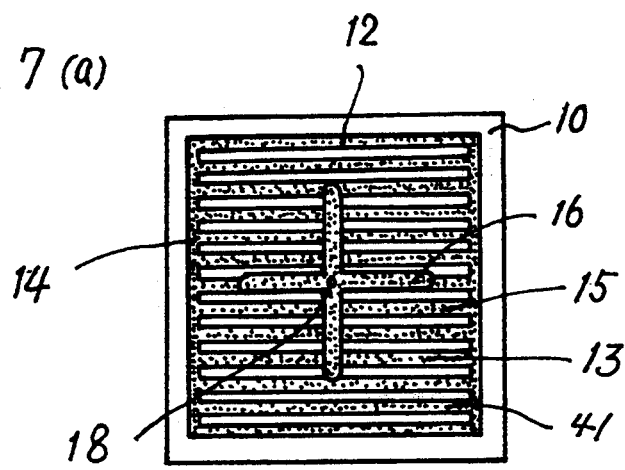
FIGS. 7(a) to 7(c) are elevations of a die for producing a plastic filter according to a further modified embodiment of the present invention.
Figure 7:
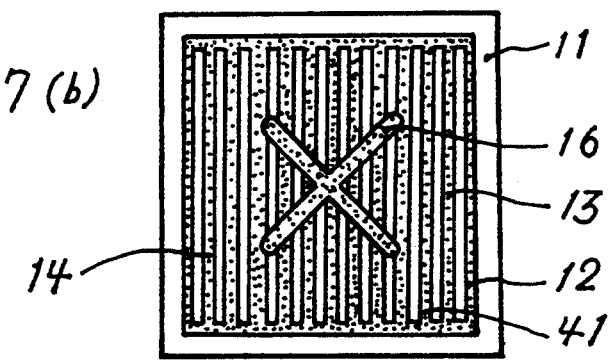
Figure 7:
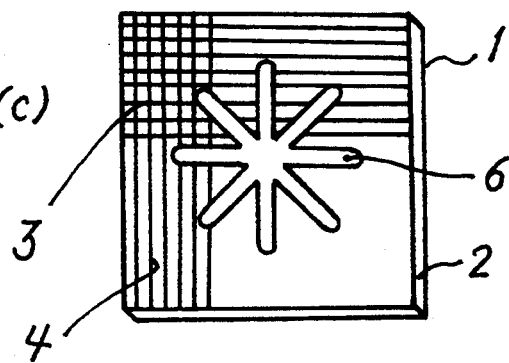

FIGS. 7(a) to 7(c) show a modified embodiment of a die for forming the dam/discharge ribs 6 extending radically across the net grooves 13. FIG. 7(a) shows "+" cross shaped dam/discharge rib grooves 16 formed in parallel with and normal to the horizontal rib grooves 15 of the upper die 10 and FIG. 7(b) shows "+" cross shaped dam/discharge rib grooves 16 formed obliquely on the vertical rib grooves 14 of the lower die 11. When the upper die 10 of FIG. 7(a) and the lower die 11 of FIG. 7(b) are pushed against each other, the resulting filter 1 has the radially extending dam/discharge ribs 6 and the meshed fabric net 3 of a given fine pitch as shown in FIG. 7(c).

Plating 41 is shown by the dots in FIGS. 7(a) and 7(b). A plating material having non-adhesive or sliding property, such as NIMUFLON which is the trademark of Japanese corporation HIKIFUNE, is applied to top surfaces of the net grooves 13, the dam/discharge rib grooves 16, and the frame grooves 12. The plating technique enhances remarkably the flowability of the plastic material 19 in the die.

The conventional plating material is believed to be improper for application to precision dies for manufacturing fine-pitch net filters because of clogging of the grooves. For this end, plating was rarely used in the industry of the die and injection molding.

Another embodiment is shown in FIGS. 8(a)–8(c). Only either an upper die 10 or lower die 11 has the vertical and horizontal rib grooves 14, 15 and the dam/discharge rib grooves 16. In FIG. 8(a), there is shown the vertical and horizontal rib grooves 14, 15 and the dam/discharge rib grooves 16 formed in the upper die 10 for making round and good-looking the appearance of the resulting plastic filter products. However it is obvious that the above grooves may be all formed in the lower die 11.

To improve accuracy and yield of molding, auxiliary dam/discharge rib grooves 17 may be formed on the net grooves 13 and independently of the dam/discharge rib grooves 16. In this case the gates 18 are provided for the auxiliary dam/discharge rib grooves 17 and the main dam/discharge rib grooves 16. In FIGS. 8(b) and 8(c) there are shown cross sections along the lines C—C' and D—D' in FIG. 8(a).

A cutter necessary for processing the grooves in the die will be described with reference to FIGS. 9(a)–9(c).

In the past, this sort of cutter was made by grinding the grooves of the die with the free cutting steel chip or the special high speed steel chip. These chips are, however, expensive and are worn out easily by revolution or overload.

The present invention provides a useful cutter structure and cutting method which permits the use of an inexpensive normal high speed steel chip.

Figure 9:
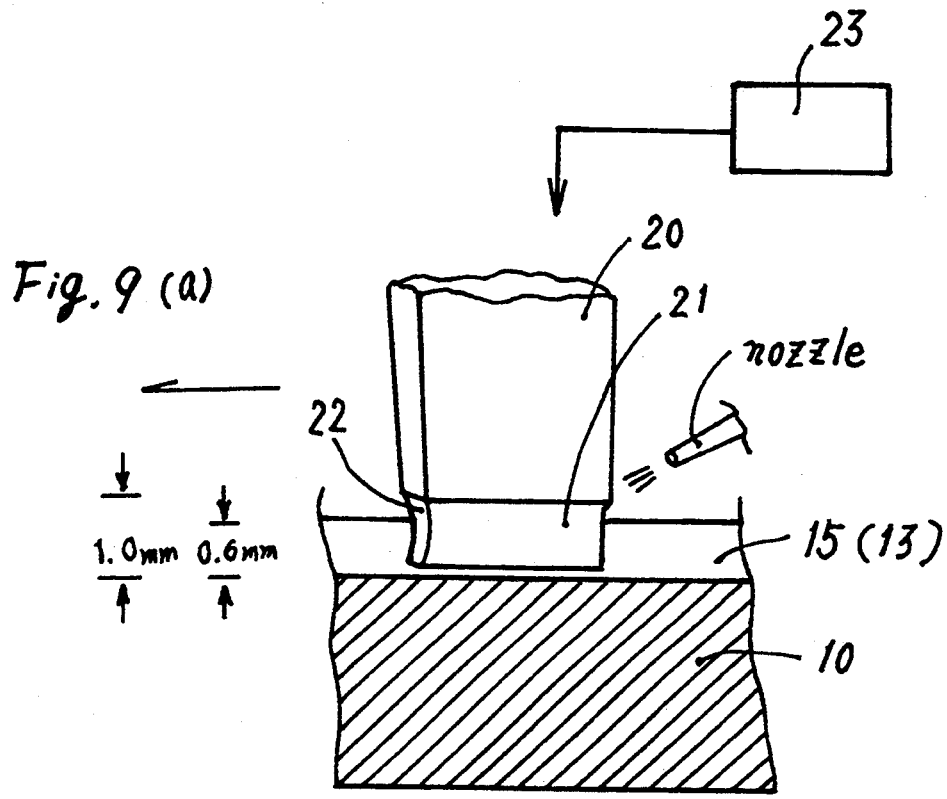
FIGS. 9 (a) to 9 (c) are side views of a cutter for forming rib grooves in the die.
Figure 9:
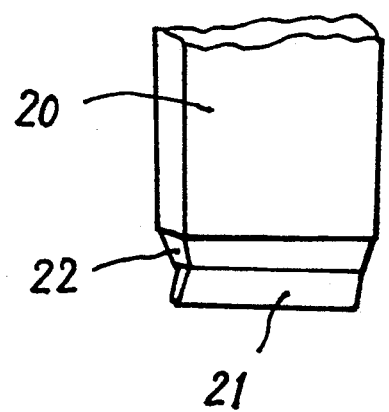
Figure 9:
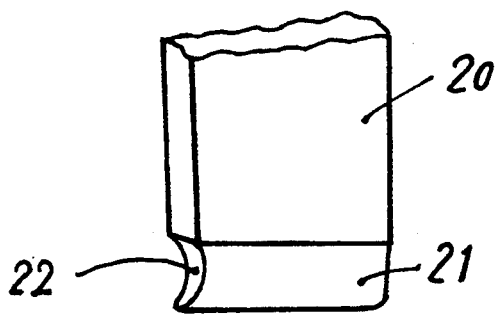

In FIG. 9(a) there is shown the net grooves 13 being formed in the die by a cutter 20 in which the height of a cutter edge 21 is a little bit higher than the depth of the net grooves 13, because otherwise the cutter would be damaged easily. In the inventor's experiments, a proper height of the cutter blade 20 was 1.0 mm when the height of the net grooves was 0.6 mm.

As illustrated, a taper 22 is formed at a forward end of the cutting edge 21 and is worked into a mirror surface.

The cutter 20 is driven to move in linear mode and not in rotation mode, making it possible to use a normal high speed steel chip for cutting the grooves without abrasion of the chip. An ultrasonic vibrator 23 is installed which provides fine vibration to the cutter 20 for finishing the grooves into mirror surface. For optimal vibrating cutting, the direction of vibration agrees with the cutting direction and the ultrasonic frequency is about 20 KHz.

The cutter blade 22 may be damaged soon if ultrasonic vibration is given to the cutter blade 22 to impose overload on the cutting blade 22. To solve the above problem, the present invention uses spraying of a lubricant oil over the cutter blade 22 from back toward the cutting direction to prevent the cutter blade 22 from being damaged.

In FIGS. 9(b) and 9(c), there are shown different shapes of the edges, one of which is a double "V" shape and the other one is a semi-circular shape for making smooth the injection of the plastic material into the net grooves 13.

Provided that the dies are made by the cutter according to the present invention, it needs only low power and there are little scraps in the cutting process and the irregularity of the surface of the grooves is minimized to about 2 to 3 μm. The intersections of the vertical and horizontal ribs 4, 5 are finished cleanly and neatly and the cutting speed is five times as high as 2,000 m / min in the prior art device. Good looking appearance of final products and high cutting speed are best suitable for mass production of plastic filters.

Figure 10:
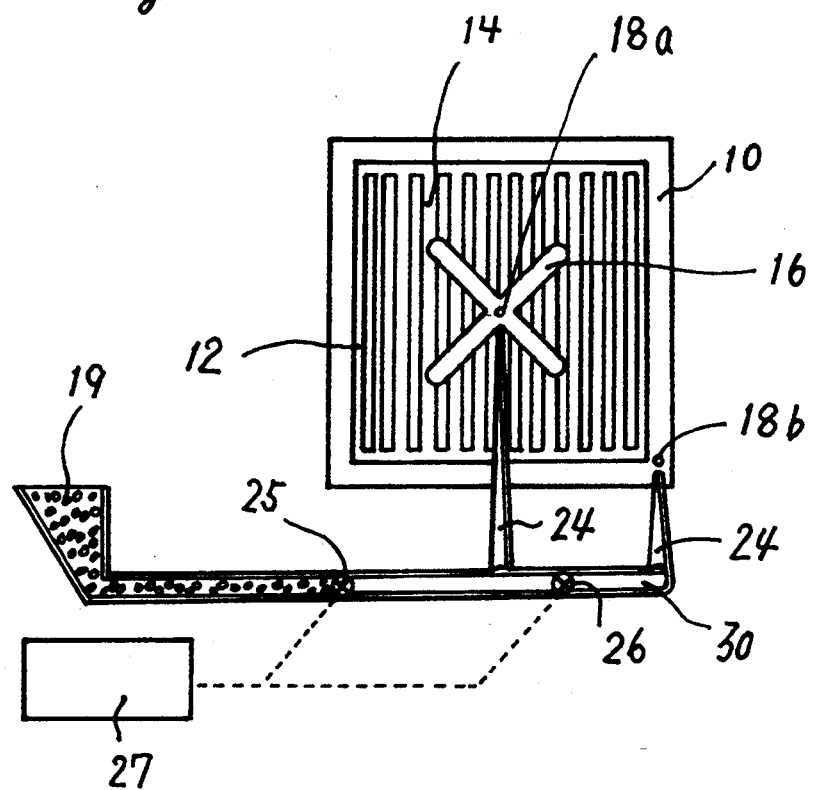
FIG. 10 is an elevation showing a process for feeding plastic material to be molded into the rib grooves of the die.

FIG. 10 shows an improvement of a method or process relating to the injection molding method and die according to the present invention. There are a first gate 18a and a first valve 25, a second gate 18b and a second valve 26 for injecting the plastic material 19 into the frame groove 12 and the dam/discharge rib grooves 16 of the upper die 10, respectively.

There are very rare cases where if the plastic material 19 is injected from one gate only, the plastic material 19 loses injection pressure or power, before reaching the frame grooves 12, and thus a sufficient amount of the plastic material is not distributed to the frame grooves and ragged surfaces are seen in the resulting frame.

The present invention can prevent the above phenomenon with certainty. The first valve 25 is opened to supply the plastic material 19 into the dam/discharge rib grooves 16 and the net grooves 13 by way of a runner 30 and a spur 24, and upon subsequent closure of the first valve 25, the second valve is opened to supply the plastic material 19 into the frame grooves 13 through the runner 30 and spur 24. The above control is provided by a controller 27 which comprises a well-known micro processor. Through these process, all of the grooves of the die are filled up with the plastic material 19 is filled up entirely.

Figure 11:
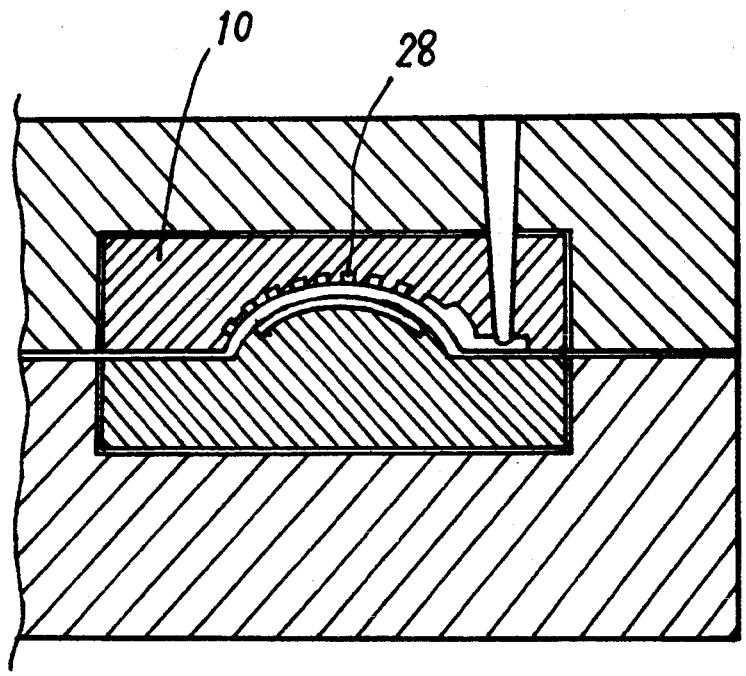
FIG. 11 is a cross section of a die for producing a gadget by plastic molding according to a modified embodiment of the present invention.

In FIG. 11, there is shown a plastic molding die for gadgets such as nets of ear phone and speaker. For those gadgets, it is not desirable to expose the wide-diameter dam/discharge ribs to the outside world from a viewpoint of appearance and performance.

The present invention provides a die specially designed to prevent the dam/discharge ribs from appearing in the appearance of the plastic filter.

As illustrated, this embodiment is directed to the ear phone net in which a pressing face of the upper nest of die 28 is concave shaped, and the net grooves 15 are formed on the entire pressing surface and the dam/discharge rib grooves 16 are formed at the bottom and periphery of the net grooves 15.

A pressing surface of the lower nest die 29 is convex shaped and the net grooves 13 are formed in the entire pressing surface.

In this case, the dam/discharge rib grooves 16 may be formed partially or entirely along the periphery of the net grooves. Some of the dam/discharge rib grooves 16 may extend radically into the lower nest die 29. By pressing the two dies, the dam/discharge ribs 6 are located in the edge of the plastic filter. Therefore, the dam/discharge ribs 6 disappear from the user's view on outward of the plastic filter and do not impair the appearance or performance of the plastic filter, because the dam/discharge ribs are formed at a lower level of the plastic filter and not at an upper level thereof.

FIG. 12(a) shows a die for producing a cylindrical or prism shaped plastic filter. The upper nest die 28 has the dam/discharge rib grooves 16 and the net grooves 13 to form a top surface of the cylindrical or prism shaped plastic filter, whereas the lower nest die 29 has the dam/discharge rib grooves 16 and the net grooves 13 on its side to form side surfaces of the cylindrical or prism shaped plastic filter. The top surface 33 of the net 3 is formed by flowing and injecting the plastic material 19 through the runner 30 in a horizontal direction.

The side surfaces 34 of the net 3 are formed by flowing the plastic material 19 from gate 18 to the vertical rib grooves 14 through the runner 30 in a vertical direction and the spur 24. After injecting the plastic material 19 into these dies and dividing the pieces of the dies, the cylindrical or prism shaped plastic filter of the fine-pitch net 3 structure, including the dam/discharge ribs 6, is produced.

The side surface 34 may have reinforce ribs 31 for supporting the net 3 in order to bear the same physical strength as does the frame. For this purpose, support rib grooves 32 are formed in the lower nest die 29 as shown in FIG. 12(a). In FIG. 12(b) there is shown the cylindrical or prism shaped plastic filter, with the dam/discharge ribs 6 at the side surfaces 34.

Figure 13A:
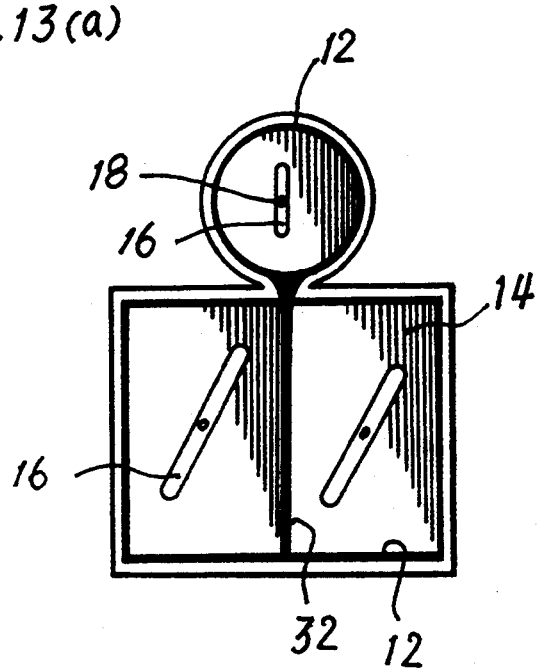
FIG. 13(a) is an elevation of a die for producing a cylindrical shaped plastic filter according to a modified embodiment of the present invention.

FIG. 13(a) shows another embodiment of a die for producing a cylindrical shaped plastic filter without using a divided die. This is concerned with a die for producing such cylindrical shaped plastic filter as an integral unit between horizontal pressing faces of an upper nest die and a lower nest die.

The net grooves 13 in the top and side surfaces 33, 34 of the cylindrical shaped or box shaped plastic filter are formed in the upper die 10. Provided that the frame grooves are shared commonly by the top and side surfaces 33, 34, it is useful when the top surface 33 and the side surface 34 are assembled by the welding or adhering process, because the two surfaces are never separated.

Figure 13B:
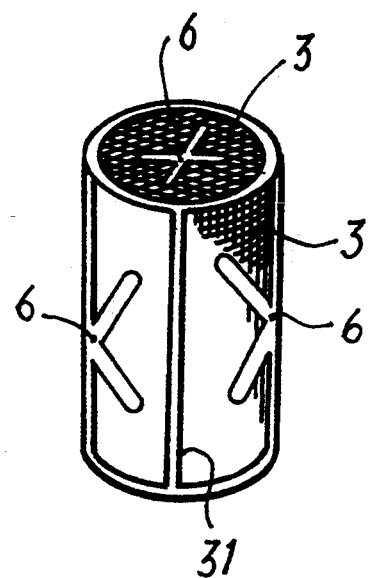
FIG. 13(b) is a perspective view of the cylindrical plastic filter molded by the die of FIG. 13(a)

Although this embodiment may not produce a cylindrical shaped plastic filter through one molding process, it is still advantageous in that the die structure is simple because the top surface 33 and the side surfaces 34 may be formed at the pressing faces of the upper die and the lower die at the same time. FIG. 13(b) shows a perspective view of the plastic filter as shown in FIG. 13(a).

Figure 14A:
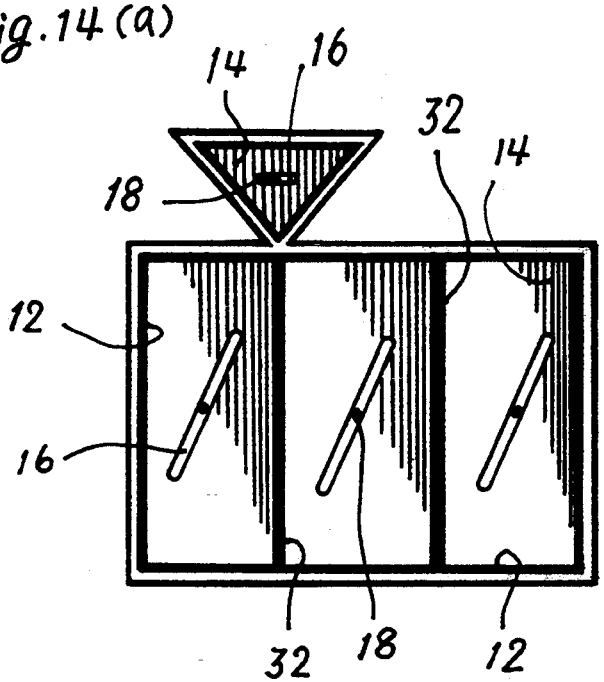
FIG. 14(a) is an elevation of a die for producing a prism shaped plastic filter according to a modified embodiment of the present invention.
Figure 14B:
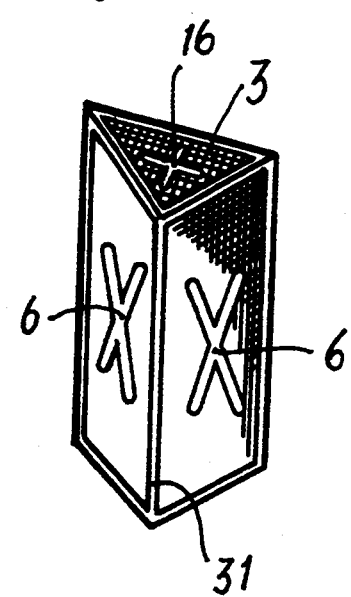
FIG. 14(b) is a perspective view of the prism plastic filter molded by the die of FIG. 14(a)

FIG. 14(a) shows the embodiment of a die for producing a prism shaped plastic filter. FIG. 14(b) shows a perspective view of the plastic filter as shown in FIG. 14(a).

In FIGS. 15(a) to 15(c), there are shown a die and a filter having vertical and horizontal ribs 4 and 5 at least one of which is formed in a serpentine shape.

Smaller-diameter vertical rib grooves 14, a frame groove 12 surrounding the vertical rib grooves 14, and the dam/discharge rib grooves 16 are formed in straight vertical rib grooves 14, the dam/discharge rib grooves 16 being greater in diameter than the vertical rib grooves 14 and not being connected to the frame groove 12 directly. They are formed in the upper die 10 as shown in FIG. 15(a).

The serpentine-shaped horizontal rib grooves 15, the frame groove 12 and the thicker dam/discharge grooves 16 are formed in the lower die 11 as shown in FIG. 15(c).

FIGS. 15(b) and 15(d) show cross sections taken along the lines E—E' and F—F' as shown in FIGS. 15(a) and 15(c).

FIG. 15(e) shows an elevation of a plastic filter which is produced by placing the upper die 10 against the lower die 11 under pressure. The resulting filter comprises the vertically extending liner ribs 4, the serpentine-shaped horizontal ribs 5, the dam/discharge ribs 6 and the frame ribs 2.

By combining the serpentine horizontal ribs 5 with the straight vertical ribs 4, fine dusts and particle are shut off or filtered out by a disturbed stream of the air or fluid at the net structure 3.

In FIG. 16(a) there is shown the upper die 10 having vertical ribs 4 in a slow serpentine curve. FIG. 16(c) shows the lower die 11 having the horizontal ribs 5 of a serpentine curve at a relatively short interval.

FIGS. 16(b) and 16(d) show cross sections taken along the lines G—G' and H—H' as shown in FIGS. 16(a) and 16(c). FIG. 16(e) shows an elevation of a plastic filter which is produced by pressing the upper die 10 against the lower die 11. The plastic filter so produced includes the vertical ribs 4 with gentle serpentine curves, the horizontal ribs 5 of serpentine curves, the dam/discharge ribs 6 and the frame 2.

In FIGS. 17(a)–17(e) there is shown another embodiment of a die having the vertical rib grooves 14 having different depths in the vertical direction and the horizontal rib grooves 15. FIG. 17(a) shows the upper die 10 having horizontal rib grooves 15 of a fixed depth and FIG. 17(c) shows the lower die 11 having the horizontal rib grooves 15 of different depths.

FIG. 17(e) shows an elevation of a plastic filter which is produced by pressing the upper die 10 against the lower die 11 during molding injection. FIGS. 17(b) and 17(d) show cross sections taken along the line I—I' and J—J' as shown in FIGS. 17(a) and 17(c).

Although not shown in the drawings, other variant embodiments may be considered as follows:

(1) both the vertical rib grooves 14 and the horizontal rib grooves 15 have different depths in a vertical direction;

(2) different-depth grooves have serpentine curves in the vertical direction with respect to the top surface of the die.

In FIGS. 18(a) to 18(e) there is shown a die having a plurality of nets 12 with the vertical and horizontal grooves 14, 15 and the frame groove 12 on the same surface of one die and having a hinge groove 35 between the plurality of nets 52. FIG. 18(a) shows the upper die 10 having first and second surfaces of dies 42, 43 with the horizontal rib grooves 15 placed alternately at each surface of die and frame groove 12. FIG. 18(c) shows the lower die 11 having the third and fourth surfaces of dies 44, 45 with the vertical rib grooves 14 placed alternately 16 at each surface of die and frame groove 12, and having a hinge groove 35 between third and fourth surfaces of dies 44, 45 for conjoining the two net structures.

Further convex and concave hinge grooves 36, 37 are formed on the edge of the third and fourth surfaces of the dies 44, 45 for structuring the hinges 39, 40 to hook the two net structures to each other. FIGS. 18(b) and 18(d) show cross sections taken along the lines K—K' and L—L' as shown in FIGS. 18(a) and 18(c). FIG. 18(e) shows an elevation of a plastic filter which is produced by pressing the upper die 10 against the lower die 11 and injecting the plastic material therebetween.

A unitary double net filter may be produced if the two nets in the resulting molding product is folded back at the point of the hinge 38. It is obvious that the resulting filter product of the two net structures may enhance the screening or filtering performance of fine dusts or particle. Pursuant to the present invention, a unitary multi-layered filter may be produced by a single molding process using the above illustrated die.

Figure 19A:
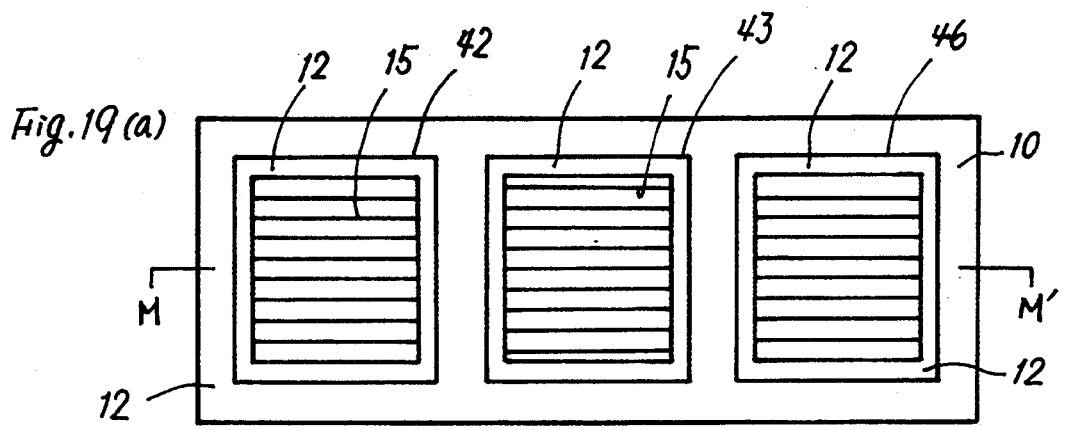
FIGS. 19(a) to 19(e) are elevations of a die for producing a triple piled filter and the filter produced according to a modified embodiment of the present invention.
Figure 19B:
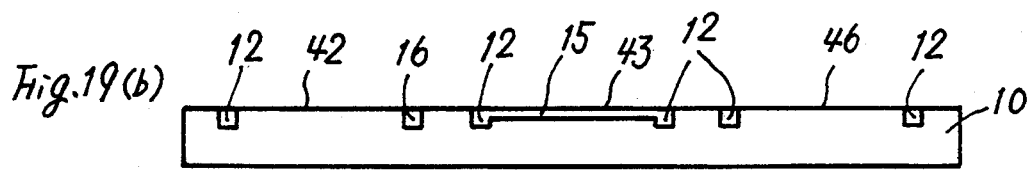
Figure 19C:
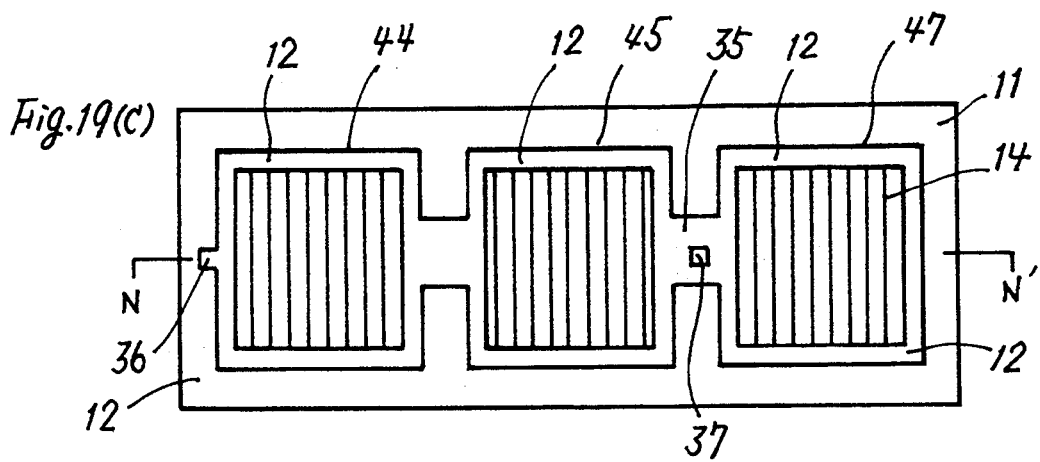

In FIGS. 19(a) to 19(e), there is a die having a plurality of nets 52 with the vertical and horizontal grooves 14, 15 and the frame groove 12 on the same surface of one die and having a hinge groove 35 between the plurality of nets 52. FIG. 19(a) shows the upper die 10 having first, second and fifth surfaces of dies 42, 43 and 46 with the horizontal rib grooves 15 placed alternately at each surface of die and frame groove 12. FIG. 19(c) shows the lower die 11 having third, fourth and sixth surfaces of dies 44, 45 and 47 with the vertical rib grooves 14 placed alternately at each surface of die and frame groove 12, and having the hinge groove 35 between the fourth and sixth surfaces of dies 45 and 47 for conjoining the plurality of the net structures.

Figure 19D:
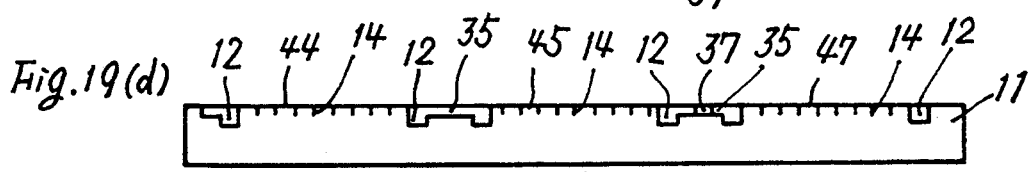
Figure 19E:
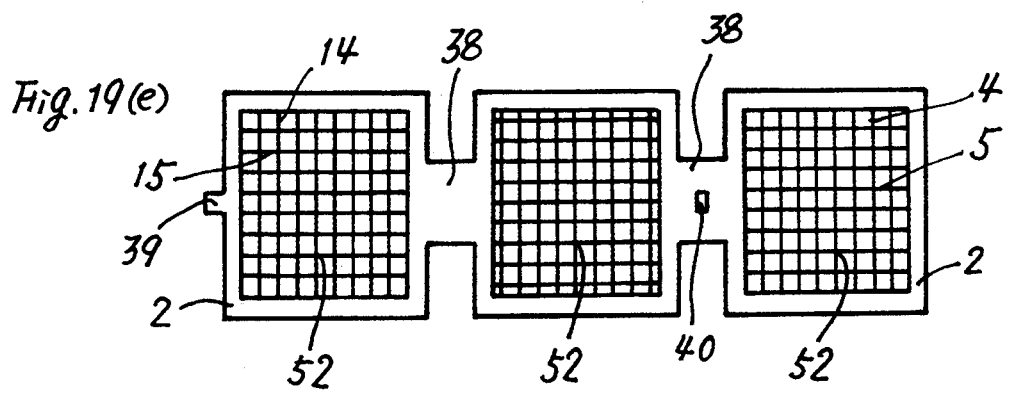

Further the convex hinge groove 36 is formed on the edge of the third surface of die 44 and the concave hinge groove 37 in the hinge groove 35 between the fourth surface of die 45 and the sixth surface die 47 for structuring the hinges 39, 40 to hook the three nets each other. FIGS. 19(b) and 19(d) show cross sections taken along the lines M—M' and N—N' as shown in FIGS. 19(a) and 19(c). FIG. 19(e) shows an elevation of a plastic filter which is produced by pressing the upper die 10 against the lower die 11 and injecting the plastic material therebetween.

A unitary triple net structure filter is completed by folding back three nets at the point of each hinge 38. Further enhancement of screening and filtering performance of fine dusts and particles is observed. The triple net structure filter may be produced by a single molding process using the above illustrated die. This embodiment characterizes that one of the hinges 38 is used as the concave hinge 40.

As above mentioned, the invention provides a superior plastic filter which is easy to produce and exhibits excellent filtering performance as a fine pitch plastic filter. By forming the dam/discharge rib grooves in the die, the plastic material is injected smoothly into the narrow rib grooves through a gate under a certain constant pressure and pushed out to the frame groove through the wider or broader dam/discharge rib grooves which provide a certain constant pressure for melted plastic material while keeping or maintaining the plastic material for a while. The vertical and horizontal ribs conjoin each other at the respective intersections thereof to form a unitary rib configuration, so that the filter may enjoin very high physical strength. The present invention is also useful and effective in supplying precision filters in medical applications since the uniformity of the mesh structure in the plastic filter of the invention is remarkable and excellent.

Further, the present invention provides significant improvements in the function and performance of the relevant instruments and attachments for producing fine-pitch plastic filters, including the groove-forming cutter, the ultrasonic vibrator and the shape and configuration of the dam/discharge ribs and grooves.

While preferred embodiments have been described, various modifications and substitutions may be made without departing from the spirit and scope of the invention. Accordingly, it is understood that the present invention has been described by way of illustration and not limitation.

What is claimed is:

1. A plastic net article by plastic injection molding, comprising:
   (a) a net structure including a plurality of vertical ribs and a plurality of horizontal ribs for defining meshes at each of crossings of the vertical and horizontal ribs, the vertical and horizontal ribs being connected as a plastic injection molded unitary body;
   (b) a frame structure surrounding the net structure including the meshes defined by the vertical and horizontal ribs, the frame structure being connected as a part of the plastic injection molded unitary body with the vertical and horizontal ribs in the net structure;
   (c) at least one dam/discharge rib formed in the net structure, the dam/discharge rib being thicker or broader than the vertical and horizontal ribs for storing molten plastic material during plastic injection molding, the dam/discharge rib being of a closed configuration by not connecting to the frame structure for accumulating pressure of the molten plastic material during plastic injection molding, the accumulated pressure being effective in distributing the molten plastic material throughout the vertical and horizontal ribs, the dam/discharge rib being connected as a part of the plastic injection molded unitary body with the vertical and horizontal ribs in the net structure.

2. The plastic article as claimed in claim 1, wherein the dam/discharge rib is extended on the net radially from the center of the net toward the frame.

3. The plastic article as claimed in claim 1, wherein the dam/discharge rib has a thicker or broader portion than the remaining portion.

4. The plastic article as claimed in claim 1, wherein the dam/discharge rib further includes a branch rib as a unitary body.

5. The plastic article as claimed in claim 1, further comprising a plurality of auxiliary dam/discharge ribs located in the net separating from the dam/discharge rib.

6. The plastic article as claimed in claim 1, wherein the vertical and/or horizontal ribs have a certain special shape other than straight lines for improving the filtering of fine particles.

7. The plastic article as claimed in claim 6, wherein the vertical and/or horizontal ribs are of different shape among their adjacent and/or crossing ribs.

8. The plastic article as claimed in claim 6, wherein the vertical and/or horizontal ribs have a serpentine shape in a horizontal direction with respect to a surface of the filter.

9. The plastic article as claimed in claim 6, wherein the vertical and/or horizontal ribs have a serpentine shape in a vertical direction with respect to a surface of the filter.

10. The plastic article as claimed in claim 1, further comprising:
(a) a plurality of the net of the crossing vertical ribs and horizontal ribs, the nets being connected together whereby a cylindrical or square shaped filter is structured by assembling the plurality of the nets.

11. A plastic article of plastic injection molding, comprising:
(a) a net structure including a plurality of vertical ribs and a plurality of horizontal ribs for defining meshes at each of crossings of the vertical and horizontal ribs, the vertical and horizontal ribs being connected as a plastic injection molded unitary body;
(b) at least a dam/discharge rib formed in the net structure, the dam/discharge rib being thick or broader than the vertical and horizontal ribs for storing molten plastic material during plastic injection molding, the dam/discharge rib being of a closed configuration for accumulating pressure of the molten plastic material during plastic injection molding, the accumulated pressure being effective in distributing the molten plastic material throughout the vertical and horizontal ribs, the dam/discharge rib being connected as a part of the plastic injection molded unitary body with the vertical and horizontal ribs in the net structure.

12. A plurality of nets formed by crossing vertical and horizontal ribs, comprising:
(a) a hinge formed between the nets for connecting the nets with each other;
(b) one of the nets having a convex hinge on its side;
(c) another net of the nets having a concave hinge on its side for hanging with the convex hinge, whereby a double net article is structured, and
(d) each of the nets comprising
(i) a net structure including a plurality of vertical ribs and a plurality of horizontal ribs for defining meshes at each of crossings of the vertical and horizontal ribs, the vertical and horizontal ribs being connected as a plastic injection molded unitary body;
(ii) a frame structure surrounding the net structure including the meshes defined by the vertical and horizontal ribs, the frame structure being connected as a part of the plastic injection molded unitary body with the vertical and horizontal ribs in the net structure;
(iii) at least one dam/discharge rib formed in the net structure, the dam/discharge rib being thicker or broader than the vertical and horizontal ribs for storing molten plastic material during plastic injection molding, the dam/discharge rib being of a closed configuration by not connecting to the frame structure for accumulating pressure of the molten plastic material during plastic injection molding, the accumulated pressure being effective in distributing the molten plastic material throughout the vertical and horizontal ribs, the dam/discharge rib being connected as a part of the plastic injection molded unitary body with the vertical and horizontal ribs in the net structure.

* * * * *